(12) United States Patent
Swingley

(10) Patent No.: US 7,178,557 B2
(45) Date of Patent: Feb. 20, 2007

(54) CPVC DRAIN WASTE AND VENT FITTINGS

(75) Inventor: Douglas Swingley, Santa Clarita, CA (US)

(73) Assignee: Spears Manufacturing Co., Sylmar, CA (US)

( * ) Notice: Subject to any disclaimer, the term of this patent is extended or adjusted under 35 U.S.C. 154(b) by 0 days.

(21) Appl. No.: 10/631,382

(22) Filed: Jul. 30, 2003

(65) Prior Publication Data

US 2004/0194840 A1 Oct. 7, 2004

Related U.S. Application Data

(60) Provisional application No. 60/458,233, filed on Mar. 26, 2003.

(51) Int. Cl.
*F16L 9/22* (2006.01)

(52) U.S. Cl. ............................... 138/155; 138/DIG. 11; 285/132.1; 428/36.92

(58) Field of Classification Search ................ 138/155, 138/177, 178, DIG. 11; 428/36.91, 36.92; 285/131.1, 132.1, 133.11
See application file for complete search history.

(56) References Cited

U.S. PATENT DOCUMENTS

| | | | | |
|---|---|---|---|---|
| 4,457,542 A | * | 7/1984 | Shaefer et al. ................. 285/55 |
| 4,514,244 A | * | 4/1985 | Shaefer et al. ............... 156/158 |
| 4,650,367 A | * | 3/1987 | Dietzler ......................... 405/43 |
| 4,768,813 A | * | 9/1988 | Timmons ...................... 285/373 |
| 5,366,257 A | * | 11/1994 | McPherson et al. ...... 285/148.11 |
| 5,423,345 A | * | 6/1995 | Condon et al. .............. 137/360 |
| 5,437,138 A | * | 8/1995 | Tuohey et al. .............. 52/741.1 |
| 5,591,497 A | * | 1/1997 | Hartitz .................... 428/36.92 |
| 5,685,577 A | * | 11/1997 | Vanesky ................... 285/294.3 |
| 5,769,128 A | * | 6/1998 | Auvil et al. .................. 138/143 |
| 5,775,378 A | * | 7/1998 | Auvil et al. .................. 138/143 |
| 5,786,054 A | * | 7/1998 | Platusich et al. ......... 428/36.91 |
| 5,851,036 A | * | 12/1998 | Vanesky ................... 285/294.1 |
| 5,922,094 A | * | 7/1999 | Richards ....................... 55/355 |
| 6,481,374 B1 | * | 11/2002 | Lillig .......................... 119/52.1 |
| 6,540,261 B1 | * | 4/2003 | Painter et al. ........... 285/133.11 |
| 6,740,237 B1 | * | 5/2004 | Roberts et al. .............. 210/275 |
| 6,887,926 B1 | * | 5/2005 | Parhar et al. ................ 524/128 |
| 6,967,045 B1 | * | 11/2005 | Bertram .................... 428/36.91 |
| 2003/0056826 A1 | * | 3/2003 | Thomas ....................... 137/360 |

OTHER PUBLICATIONS

Charlotte Pipe and Foundry Company, ChemDrain, Nov. 14, 2005, Charlotte Pipe and Foundary Company, www.charlottepipe.com, home page for ChemDrain.*

Charlotte Pipe and Foundry Company, ChemDrain Technical and Installation manual, updated Sep. 2005, Charlotte Pipe and Foundry Company, pp. 1, 28-29.*

* cited by examiner

*Primary Examiner*—James Hook
(74) *Attorney, Agent, or Firm*—Denton L. Anderson; Sheldon Mak Rose & Anderson PC

(57) ABSTRACT

A drain, waste and vent ("DWV") fitting is made from chlorinated polyvinyl chloride.

11 Claims, 1 Drawing Sheet

CPVC DRAIN WASTE AND VENT FITTINGS

RELATED APPLICATIONS

Figure 1:
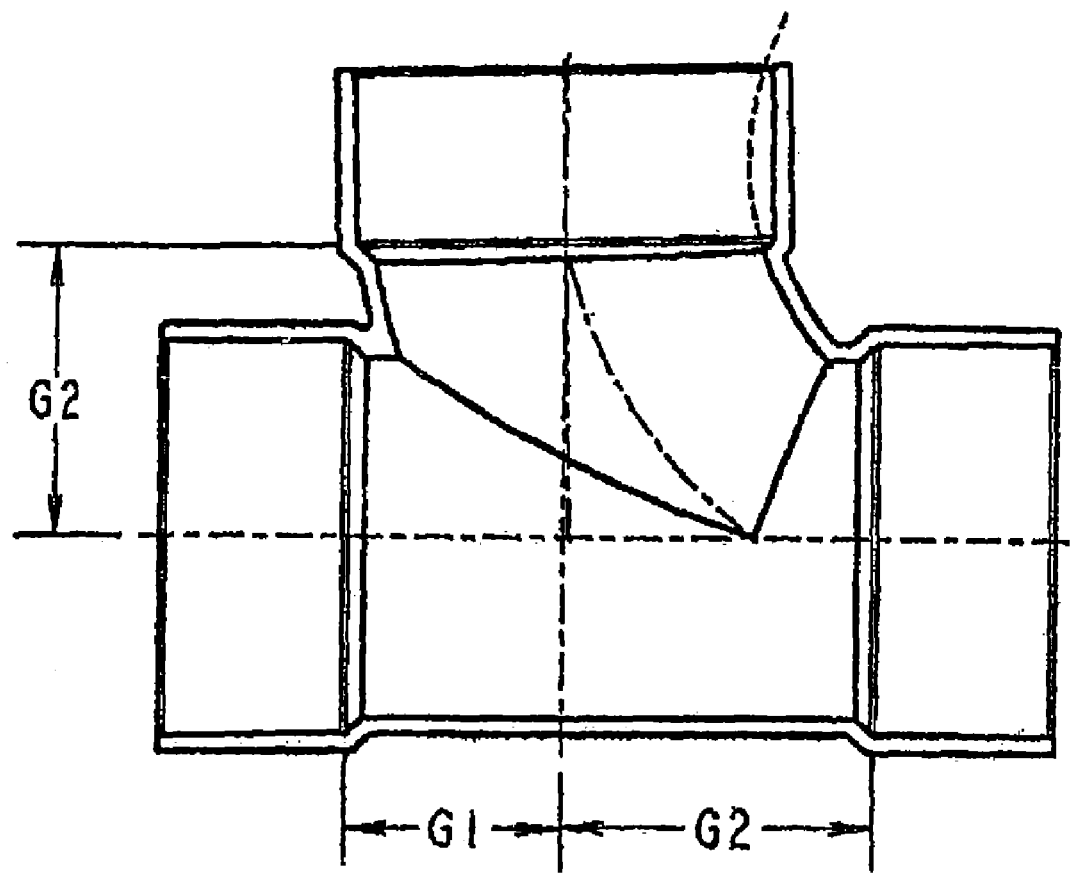

This application is a continuation-in-part of provisional Application Ser. No. 60/458,233, filed Mar. 26, 2003, entitled CPVC DRAIN WASTE AND VENT FITTINGS.

FIELD OF THE INVENTION

This invention relates generally to fittings and, more specifically, to drain, waste, and vent fittings used for piping that handles corrosive waste.

BACKGROUND OF THE INVENTION

Drain, waste, and vent fittings (referred to as "DWV fittings" or "DWV pattern fittings") have been used for many years to move liquids at low pressures using gravity. DWV fittings are used to move waste liquids and solids out of bathrooms and kitchens and into sanitary sewers. DWV pattern fittings are also used to plumb, as drains for roof and floor, in industrial processes, in institutional settings, and in commercial waste systems.

DWV fittings for handling non-corrosive waste have been constructed of many materials: clay, iron, copper, ABS plastic, and PVC plastic. DWV fittings are generally of the type having sweeping full bore solids handling design and fall. "Fall" as that term is used in drain systems means to move the material and keep the pipe from filling with solids. Typical fall is about ¼" per foot, meaning every foot of pipe is ¼" lower than the last. This fall is typically built into the fittings. For example, in the case of a sanitary tee branch, the sanitary tee branch isn't exactly 90 degrees, so that when pipe is attached to it, the tee branch approaches at a slope of about ¼" per foot.

Problems, however, arise when DWV fittings are used in piping systems that handle corrosive waste. As used herein, "corrosive waste" includes waste such as chemical corrosives and/or waste that can reach temperatures of about 210 degrees Fahrenheit. One problem with present DWV fittings used for corrosive wastes is that present fittings are susceptible to the formation of leaks over time. Another problem is that installation of present fittings can be cumbersome and time consuming.

DWV fittings for handling corrosive waste have typically been constructed of either polyolefin ASTM F1412-01, specifically polypropylene (PP) with a flame retardant added, or polyvinylidene Fluoride ASTM F1673-95. These fittings can require a mechanical joint connection system or a fusion connection system to connect pipe to fittings. The mechanical joining method is time consuming and prone to leaking after time because the plastic moves and the joint loosens. The fusion method is difficult, cumbersome, and requires special equipment. Most fusion systems use metal coils and an electrical device to heat and melt the two surfaces to be joined. These metal coils remain in the middle of the joint and can be corroded away causing a leak-path if they become exposed on the inside. The fusion joining method is not consistently dependable. The fusion joining method varies in consistency based on the quality of power available on the job sites, the skill of the installer, and the required dimensional stability of the parts to be joined. Leaks are not uncommon in corrosive waste systems that use polyolefin DWV fittings and polyvinylidene fluoride DWV fittings.

Accordingly, there is a need for DWV fittings that avoid the aforementioned problems of difficulty in installation and susceptibility to leaks in the prior art.

DRAWINGS

FIG. 1 shows a DWV fitting having features of the present invention.

DETAILED DESCRIPTION

Patterned fittings constructed of CPVC "chlorinated polyvinyl chloride" solve the need for DWV fittings that can handle corrosive waste. CPVC fittings are easily installed, and are not as susceptible to leaks as the fittings in the aforementioned prior art.

DWV fittings made from CPVC are easily installed, and provide a strong bond with pipes. For example, CPVC like PVC materials, can be solvent cement welded, or joined by chemically dissolving the surface of both pipe and fitting, forcing the two together, then allowing the solvent to leave and, are common installation practices used by those of ordinary skill in the art. Solvent cementing is much easier, requires significantly less skill, and produces a more leak resistant joint than other joining methods. The invention described in this application has these useful benefits over the aforementioned prior art.

DWV patterned fittings of the present invention are preferably made from CPVC material compounds corresponding to ASTM D1784, *Standard Specification for Rigid Ply (Vinyl Chloride) (PVC) Compounds and Chlorinated Poly (Vinyl Chloride) (CPVC) Compounds.* The typical physical properties of DWV patterned fittings that were made according to the present invention are:

| Property | Test Method | Typical Value |
| --- | --- | --- |
| Mechanical Properties @ 73° F. | | |
| Specific Gravity | ASTM D 792 | 1.49 |
| Tensile Strength, psi | ASTM D 638 | 8010 |
| Tensile Modulus, psi | ASTM D 638 | 495,000 |
| Flexural Strength | ASTM D 790 | 13,000 |
| Izod Impact, ¼ in.ft-lb/in.notched | ASTM 256 | 1.4 |
| Thermal Properties | | |
| Heat Deflection Temperature, ° C. at 66 psi | ASTM D 648 | 101 |
| Thermal Conductivity, BTU/hr/sq ft/ ° F./in | ASTM C 177 | .95 |
| Coefficient of Liner Expansion, in/in/ ° F. | ASTM D 696 | $3.4 \times 10^{-5}$ |
| Flammability | | |
| Limiting Oxygen Index | ASTM D 2863 | 60 |
| UL 94 Rating | UL 94 | V-0, 5VB |
| Flame & Smoke Rating[1] | CAN/ULC S102.2 | |
| Pipe: Flame Spread | | 0 |
| Smoke Developed | | 5–30 |
| Fittings: Flame Spread | | 5–10 |
| Smoke Developed | | 15–50 |
| Solvent Cement | ASTM F493 | Heavy Body; Yellow Color |

[1]Based on test of physical product, as opposed to test of material only.

The DWV fittings of the present invention are inert to most mineral acids, bases, salts, and aliphatic hydrocarbons, and compare favorably to other non-metals in these chemical environments. The general chemical resistance overview of DWV fittings of the present invention are:

| Weak Acids | Excellent | Salts | Excellent |
|---|---|---|---|
| Strong Acids | Excellent | Aliphatic Solutions | Good |
| Weak Bases | Excellent | Halogens | Good-Fair |
| Strong Bases | Excellent | Strong Oxidants | Good-Fair |

DWV fittings according to the present invention have been produced according to applicable DWV patterns of ASTM D3311, *Standard Specification for Drain, Waste, and Vent ("DWV") Plastic Fitting Patters*, as well as having been produced according to speciality patterns. An example of a fitting according to the present invention is shown in FIG. 1. FIG. 1 shows a lab waste sanitary tee made from CPVC material compounds corresponding to ASTM D1784, *Standard Specification for Rigid Ply (Vinyl Chloride) (PVC) Compounds and Chlorinated Poly (Vinyl Chloride)(CPVC) Compounds*. Examples of different sizes for lab waste sanitary tee as shown in FIG. 1, include those having the following dimensions in inches for G1 and G2:

| SIZE | G1 | G2 |
|---|---|---|
| 1½ | 1¾ | 1 |
| 2 | 2⁵⁄₁₆ | 1⅜ |
| 3 | 3¹⁄₁₆ | 1¾ |
| 4 | 3¹⁵⁄₁₆ | 2¼ |
| 6 | 5 | 3½ |
| 8 | 6 | 4½ |

One of ordinary skilled in the art will recognize that other DWV fittings in a variety of different sizes, like the above sanitary tee, can be constructed using CPVC. All drainage fittings of the present invention with 90 degree angles, such as sanitary tees and elbows, preferably have socket pitch to maintain about ¼ inch per foot.

Appropriate DWV fittings of the present invention can be used to transition to piping that is not constructed of CPVC so long as the piping is suitable for corrosive waste. Piping made of CPVC is preferable for use with CPVC DWV fittings. For example, Spears® LabWaste™ CPVC Schedule 40 pipe (manufactured for and sold by Spears Manufacturing Company, 15853 Olden Street, Sylmar, Calif. 91342) which is produced in accordance with dimensional requirements of ASTM F441, *Standard Specification for Chlorinated Poly (Vinyl Chloride)(CPV) Plastic Pipe, Schedule* 40 *and* 80, is a suitable CPVC pipe, and has dimensions in inches as follows:

| | Pipe Diameter | | | | | |
|---|---|---|---|---|---|---|
| | 1½ | 2 | 3 | 4 | 6 | 8 |
| Avg. O.D. | 1.900 | 2.375 | 3.500 | 4.500 | 6.625 | 8.625 |
| Avg. I.D. | 1.592 | 2.049 | 3.042 | 3.998 | 6.031 | 7.943 |
| Min. Wall | .145 | .154 | .216 | .237 | .280 | .322 |

The thermal expansion table below is useful for the installation of this CPVC piping with fittings according to the present invention under specified temperatures:

| Length of Run (L) in feet | Length Change in Inches (ΔL) for Specified Change in Temperature (ΔT) | | | | | | | | |
|---|---|---|---|---|---|---|---|---|---|
| | 20° F. | 30° F. | 40° F. | 50° F. | 60° F. | 70° F. | 80° F. | 90° F. | 100° F. |
| 10 | .08 | .12 | .16 | .20 | .24 | .29 | .33 | .37 | .41 |
| 20 | .16 | .24 | .41 | .51 | .61 | .71 | .82 | .92 | 1.02 |
| 40 | .33 | .49 | .65 | .82 | .98 | 1.14 | 1.31 | 1.47 | 1.63 |
| 50 | .41 | .61 | .82 | 1.02 | 1.22 | 1.43 | 1.63 | 1.84 | 2.04 |
| 70 | .57 | .86 | 1.14 | 1.43 | 1.71 | 2.00 | 2.28 | 2.57 | 2.86 |
| 90 | .73 | 1.10 | 1.47 | 1.84 | 2.20 | 2.57 | 2.94 | 3.30 | 3.67 |
| 120 | .98 | 1.47 | 1.96 | 2.45 | 2.94 | 3.43 | 3.92 | 4.41 | 4.90 |

Thermal expansion change in length is calculated from expected change in temperature and given Coefficient of Linear Thermal Expansion of $3.4 \times 10^{-5}$ in./in. ° F. for CPVC as follows:

$\Delta L = 12\, eL\, (\Delta T)$:

$e = 3.4 \times 10^{-5}$ in./in. ° F.

L=Length of Run in feet

ΔT=Temperature Change in ° F.

An example of using the above thermal expansion chart is shown below: How much will a 50 ft. run Spears® LabWaste™ pipe expand if the expected ambient temperature will range from 45° F. to 85° F.?

$\Delta L = 12\, eL\, (\Delta T)$ $\Delta L = 12 \times 0.000034 \times 50 \times 40$ ΔL=0.816 inches When solvent cements are used to join DWV fittings to pipes, solvent cements are preferably produced according to ASTM F493, *Standard Specification for Solvent Cements for Chlorinated Poly (Vinyl Chloride)(CPVC) Compounds*. DWV fittings of the present invention have been easily joined to pipes made of CPVC using Spears® LW-5 One-Step Solvent Cement (manufactured for and sold by Spears Manufacturing Company, 15853 Olden Street, Sylmar, Calif. 91342) that has been specially formulated for corrosive/acid waste applications and manufactured in accordance with ASTM F-493, *Standard Specification for Solvent Cements for Chlorinated Poly (Vinyl Chloride) (CPVC) Plastic Pipe and Fittings*. When cured, this cement provides a fused joint that maintains the same physical and chemical resistance properties as the CPVC components in the system. Spears® LW-5 is a "one-step" cement and does not require the use of primer. Systems using DWV fittings and pipe made of CPVC can be additionally joined using threaded (NPT) or flanged connections where removal or connection to supplementary equipment is required. Special Compression Couplings can be used for joining to Polypropylene systems.

Solvent cement joints should be made according to directions on the cement container label. On initial assembly, all joints should be hand-held together without movement for 30 seconds. An initial set time is recommended to provide good handling strength after which the joint will handle normal stresses of installation. Cure time is the recommended waiting period prior to placing the joint into service. Set and cure time are relative to temperature at time of installation. Best results are obtained at temperatures between 400 and 110° F. The following set and cure time recommendations are estimates based on laboratory tests. Due to the many field variables, these times are useful as a general guide only.

Recommended Set & Cure Time

| Temperature | Initial Set | Cure |
| --- | --- | --- |
| 60°–100° F. | 30 min. | 1 hr. |
| 40°–60° F. | 1 hr. | 2 hr. |
| 0° F. | 2 hr. | 4 hr. |

Average Number of Joints per Quart of LW-5 One-step Cement

| | Pipe Diameter | | | | |
| --- | --- | --- | --- | --- | --- |
| | 1½ | 2 | 3 | 4 | 6 | 8 |
| No. of Joints | 90 | 60 | 40 | 30 | 10 | 5 |

Systems using DWV fitting made of CPVC should be properly supported to avoid stress caused by sagging. The following chart shows recommended horizontal support spacing. Pipe can be supported with conventional hangers and brackets. The hangers should not be over tightened to restrict pipe movement or cut into the pipe.

Recommended Hanger Spacing (feet)

| | Pipe Diameter | | | |
| --- | --- | --- | --- | --- |
| | 1½ | 2 | 4 | 6 | 8 |
| Hanger Spacing | 6 | 6 | 7½ | 8 | 9 |

The invention is suitable for underground service. Underground installation should be in a smooth, uniform trench bottom that supports the length of the CPVC DWV pipe over its entire length, free of rocks and debris. This subsoil should be stable to provide physical protection of the pipe and fittings. Where large boulders are not removed, the trench should be padded with sand or fine-grain soil. The trench should be wide enough to allow for easy installation, but should be kept as narrow as possible. The trench construction, bedding and backfill shall be in accordance with ASTM Standard D2774 and local codes.

Snaking the pipe is recommended if thermal expansion or contraction is anticipated. Pipe that is joined during the hottest portion of a summer day will undergo a certain amount of contraction during the cooler night time period. This can place stresses on a newly solvent-cemented joint, possibly causing it to separate or leak. Snaking is also suggested when the trench is backfilled with cool earth before the joints are fully cured. The following is a suggested "Loop Offset" chart:

Loop Offset in inches for Contraction:

Maximum Temperature Variation, ° F., Between Time of Solvent Welding and Final Use

| Loop Length | 10° | 20° | 30° | 40° | 50° | 60° | 70° | 80° | 90° | 100° |
| --- | --- | --- | --- | --- | --- | --- | --- | --- | --- | --- |
| | LOOP OFFSET | | | | | | | | | |
| 20 Feet | 3" | 4" | 5" | 5" | 6" | 6" | 7" | 7" | 8" | 8" |
| 50 Feet | 7" | 9" | 11" | 13" | 14" | 16" | 17" | 18" | 19" | 20" |
| 100 Feet | 13" | 18" | 22" | 26" | 29" | 32" | 35" | 37" | 40" | 42" |

A larger size pipe as a sleeve should be installed where piping must pass through masonry walls. Only solvent cement connection should be used in underground piping. The pipe should be surrounded with an initial backfill material having a particle size of ½" or less, free of sharp rock or debris and uniformly compacted in layers. Refer to ASTM D2774, *Underground Installation of Thermoplastic Pressure Piping*, for additional information on underground installations.

Preferably, DWV fittings according to the present invention used in a system should be tested with water to ensure its integrity. The testing can be in its entirety or in sections.

All openings should be closed tight except the highest opening and the system should be filled with water to the point of overflow. A minimum of ten (10) foot (3048 mm) head should be used for entire system or for each section tested. System or section should be set for about 15 minutes or longer before inspection for leaks. Duration of the test shall be per local code.

CPVC DWV pipe and fitting systems can be used with many kinds of waste, including industrial process waste, corrosive waste, sanitary waste, polyolefin acid waste, iron acid waste and glass acid waste. CPVC DWV pipe and fitting systems are ideal for use in environments which are closely controlled for flame and smoke. CPVC DWV pipe and fitting systems can be connected to polypropylene acid waste systems and to PVDF acid waste systems.

The CPVC DWV pipe and fitting systems of the invention can be disposed within other pipe and fitting systems to create a "double contained" pipe and fitting system.

In a typical embodiment, the DWV fitting of the invention consists of chlorinated polyvinyl chloride. In other embodiments of the invention, the DWV fitting consists essentially of chlorinated polyvinyl chloride.

EXAMPLE

An example of a special drainage system for corrosive chemical or acid waste according to the present invention was manufactured from CPVC Type IV material, ASTM D 1784 Cell Classification 23447. All pipe fittings and solvent cement were supplied together as a system, as Spears® Manufacturing Company, 15853 Olden Street, Sylmar, Calif. 91342. Spears® LabWaste™ CPVC Corrosive Waste Drainage Systems were manufactured to the following applicable portions of ASTM Standards:

Applicable Conformance Standards

| Conformance Criteria | Applicable Standard | Standard Specification or Practice Title |
| --- | --- | --- |
| Product Certification (3rd party approval to criteria specified below) | NSF Standard 14 Special Engineered (SE) product certification for corrosive waste end use | Standard14: Plastics Piping System Components and Related Material, NSF-cw S.E. Certified to specified conformance standards & specifications |
| Material | D1784, cell class 23447 (CPVC) | D1784: Standard Specification for Rigid Poly(Vinyl Chloride) (PVC) and Chlorinated Poly(Vinyl Chloride) (CPVC) Compounds |
| Dimensions and Tolerances - Pipe | ASTM F1412, Section 6.1, Sch 40 | F1412: Standard Specification for Polyolefin Pipe and Fittings for Corrosive Waste Drainage Systems |
| Dimensions and Tolerances - Fittings | ASTM F1412, Section 6.2 | |
| Chemical Resistance | ASTM F1412, Section 6.3 | |
| Adjusted concentrations for CPVC | ASTM 1673, Section 8.3 | |
| Water Absorption | ASTM F1412, Section 6.4 | |
| Mechanical Joint - Transition Fittings | ASTM F1412, Section 6.5 | F1673: Standard Specification for Polyvinylidene Fluoride (PVDF) Corrosive Waste Drainage Systems |
| Flattening - Pipe | ASTM F1412, Section 6.8 | |
| Impact Resistance - Pipe & Fittings | ASTM F1412, Section 6.9 | |
| Workmanship, Finish & Appearance Fittings | ASTM F1412, Section 7 | |
| Solvent Cement | F493 | F493: Standard Specification for Solvent Cements for Chlorinated Poly (Vinyl Chloride) (CPVC) Plastic Pipe and Fittings |

All pipes in the above example were Spears® LabWaste™ CPVC Schedule 40 (manufactured and sold by Spears® Manufacturing Company, 15853 Olden Street, Sylmar, Calif. 91342), and manufactured to applicable requirements of ASTM F1412. All pipes were CAN/ULC S102.2 evaluated for surface burning characteristics for flame spread and smoke development with ratings designated on the pipe marking. All pipe markings were accompanied by a yellow stripe for identification of CPVC chemical waste system. All fittings were CPVC drainage patterns meeting the applicable requirements of ASTM F1412. All fittings were CAN/ULC S102.2 evaluated for surface burning characteristics for flame spread and smoke development with ratings designated on the original package labeling. Joining method for pipe and fittings was done by solvent cement welding. Solvent cement was "one-step" primerless type CPVC cement formulated for resistance to corrosive chemicals and manufactured in accordance with ASTM F493. Spears® LabWaste™ CPVC Corrosive Waste Drainage System was independently tested for chemical resistance and certified to applicable ASTM standards as a Special Engineered (SE) product under NSF Standard 14 by NSF International, Ann Arbor, Mich.

Having thus described the invention, it should be apparent that numerous structural modifications and adaptations may be resorted to without departing from the scope and fair meaning of the instant invention as set forth hereinabove.

What is claimed is:

1. A method for draining corrosive waste through a pipe fitting comprising chlorinated polyvinyl chloride, comprising the step of transporting through the pipe fitting chemical corrosive waste under the chemical resistance conditions set forth in ASTM Standard F1412, wherein the fitting comprises a bore having a pitch that changes by at least about ¼" per foot.

2. The method of claim 1, wherein the waste is an industrial process waste.

3. The method of claim 1 wherein the waste is an acid waste.

4. The method of claim 1, further comprising the step of transporting the corrosive waste from the fitting into a pipe comprising CPVC, wherein the pipe is joined to the pipe fitting.

5. The method of claim 4, wherein the pipe and pipe fitting are joined by solvent cement welding.

6. The method of claim 4, wherein the pipe consists of CPVC and is disposed within a pipe made from a different material.

7. The method of claim 4, wherein the pipe is connected to a corrosive waste system selected from the group consisting of a polypropylene waste system, a PVDF waste system, a glass waste system, a polyolefin waste system, and an iron waste system.

8. The method of claim 1, wherein the pipe fitting consists essentially of chlorinated polyvinyl chloride.

9. The method of claim 1, wherein the pipe fitting consists of chlorinated polyvinyl chloride.

10. The method of claim 1, wherein the waste is an aliphatic solution.

11. The method of claim 1 wherein the pipe fitting is connected to a laboratory waste system.

* * * * *